(12) United States Patent
Wang

(10) Patent No.: US 8,553,621 B2
(45) Date of Patent: Oct. 8, 2013

(54) SYSTEM AND METHOD FOR SUPPORTING VOIP AND CS TELEPHONE

(75) Inventor: Qiang Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 153 days.

(21) Appl. No.: 13/201,631

(22) PCT Filed: Dec. 21, 2009

(86) PCT No.: PCT/CN2009/075772
§ 371 (c)(1),
(2), (4) Date: Aug. 16, 2011

(87) PCT Pub. No.: WO2010/102498
PCT Pub. Date: Sep. 16, 2010

(65) Prior Publication Data
US 2011/0299471 A1 Dec. 8, 2011

(30) Foreign Application Priority Data

Mar. 9, 2009 (CN) .......................... 2009 1 0079390

(51) Int. Cl.
*H04W 4/00* (2009.01)
(52) U.S. Cl.
USPC ........... 370/328; 370/401; 370/411; 370/331; 370/352; 455/436; 455/414.1
(58) Field of Classification Search
USPC ................... 370/328, 355, 352; 455/558, 411
See application file for complete search history.

(56) References Cited

U.S. PATENT DOCUMENTS

| | | | |
|---|---|---|---|
| 6,434,139 B1 * | 8/2002 | Liu et al. ...................... | 370/352 |
| 7,570,630 B1 * | 8/2009 | Phillips et al. ................ | 370/352 |
| 2006/0109867 A1 | 5/2006 | Souissi | |
| 2007/0201450 A1 | 8/2007 | Borislow et al. | |
| 2009/0124288 A1 * | 5/2009 | Song et al. .................... | 455/558 |
| 2011/0182297 A1 | 7/2011 | Souissi | |

FOREIGN PATENT DOCUMENTS

| | | |
|---|---|---|
| CN | 1722697 A | 1/2006 |
| CN | 101277327 A | 10/2008 |
| CN | 101494916 A | 7/2009 |
| WO | 2006044654 A2 | 4/2006 |

OTHER PUBLICATIONS

International Search Report on international application No. PCT/CN2009/075772, mailed on Apr. 1, 2010.
English Translation of the Written Opinion of the International Search Authority in international application No. PCT/CN2009/075772, mailed on Apr. 1, 2010.
Supplementary European Search Report in European application No. 09841367.7, mailed on Aug. 1, 2013.

* cited by examiner

*Primary Examiner* — Andrew Lai
*Assistant Examiner* — Jamaal Henson
(74) *Attorney, Agent, or Firm* — Oppedahl Patent Law Firm LLC

(57) ABSTRACT

The present invention discloses a system for supporting Voice over Internet Protocol (VOIP) and Circuit Switch (CS) telephone. The system includes a terminal gateway device, a wireless broadband module, a Subscriber Line Interface Circuit (SLIC), a SWITCH and a telephone. The present invention also discloses a method for supporting VOIP and CS telephone. By adopting the system and the method of the present invention, a subscriber can enjoy different voice services on the same telephone according to different service scenes, and a mobile operator can deploy a corresponding service in accordance with specific conditions; the present invention enhances the value-adding capability and saves communication cost.

8 Claims, 2 Drawing Sheets

SYSTEM AND METHOD FOR SUPPORTING VOIP AND CS TELEPHONE

TECHNICAL FIELD

The present invention relates to the fields of communications and electronics, and in particular to a system and method for supporting Voice over Internet Protocol (VOIP) and Circuit Switch (CS) telephone.

BACKGROUND

VOIP is the short name of Voice over Internet Protocol, which is, in brief, used for digitizing a simulated voice signal and transmitting the digital signal over an IP network in a data packet form in real time. The basic principle of the VOIP is that voice data codes are compressed and packed using a voice compression algorithm so that the voice data can be transmitted to a target terminal over an IP network, and then the data packet is reconverted to the original voice signal through an inverse process for being received by a receiver. The VOIP has been proposed for more than ten years and has been greatly improved in both voice quality and Quality of Services (QoS) with development of technologies, in addition, with advantages of convenient deployment and low price, the VOIP has been already widely applied in all over the world.

Conventional CS telephone is one part of a Public Switched Telephone Network (PSTN) and adopts a fixed channel mode in which once a communication is established, a channel is occupied by the two parties of the communication till the communication is terminated.

At present, with wireless broadband network technology being gradually improved, Third-Generation (3G) and Beyond 3G (B3G) mobile communication systems have become increasingly available. Mobile communication operators in different countries are actively deploying domestically applicable broadband communication networks to attract more users with various services, and the combination of VOIP telephone with conventional CS telephone is one of the services. A gateway device of a family or medium/small-sized enterprises integrates gateway routing devices of Local Area Network (LAN), Wireless Local Area Network (WLAN), Wide Area Network (WAN) and so forth, and is therefore capable of providing an internal networking function to users and realizing the deployment of Internet services by making full use of bandwidth of a wireless broadband.

In prior art, independent VOIP or CS telephone function can be realized by a single device or gateway, however, the utilization ratio of the device is not ideal, and it is difficult to greatly enhance the value-adding capability of the device. Additionally, a gateway can be mounted with a two-path Subscriber Line Interface Circuit (SLIC) and connected with a fixed telephone using the bandwidth of a broadband and the conventional PSTN provided by a mobile communication operator. In this way, the functions of VOIP packet telephone and CS telephone for a family and an enterprise are realized on the same device or gateway, however, the functions of the two-path SLIC are fixed, that is, the two-path SLIC can only process their respective VOIP telephone voice code streams or CS telephone voice code streams, thereby leading to a complicated workflow of the whole system and a higher cost of the whole communication. Secondarily, due to the lack of a corresponding converter, existing device or gateway cannot make a selection on a transmission mode of a CS telephone voice code stream.

SUMMARY

On this ground, the present invention is mainly to provide a system and method for supporting VOIP and CS telephone in a wireless broadband network, capable of realizing the voice functions of VOIP and CS telephone on a same telephone, enhancing the value-adding capability of the telephone and reducing the communication cost.

In order to achieve the purpose above, the technical solution of the present invention is realized as follows:

The present invention provides a system for supporting Voice over Internet Protocol (VOIP) and Circuit Switch (CS) telephone, comprising: a terminal gateway device, a wireless broadband module and a Subscriber Line Interface Circuit (SLIC), wherein the wireless broadband module is used for realizing network registration of VOIP telephone, connection to a WAN and establishment of CS telephone, and completing transmission of a voice code stream between the terminal gateway device and a wireless broadband network;

the terminal gateway device is used for determining whether a currently initiated call is a VOIP call or a CS call according to a received signal; if the currently initiated call is a VOIP call, establishing a Session Initiation Protocol (SIP) connection via the wireless broadband module, converting a Pulse Code Modulation (PCM) line signal into a VOIP voice code stream, and sending the converted VOIP voice code stream to the wireless broadband network via the wireless broadband module or converting a VOIP voice code stream from the wireless broadband module into a PCM line signal; if the currently initiated call is a CS call, establishing a CS connection via the wireless broadband module, converting a PCM line signal into a CS voice code stream, and sending the converted CS voice code stream to the wireless broadband network via the wireless broadband module or converting a CS voice code stream from the wireless broadband module into a PCM line signal; and the SLIC is used for bidirectional transmission of a Serial Peripheral Interface (SPI) signal between a telephone and the terminal gateway device as well as bidirectional transmission of a PCM line signal between a telephone and the terminal gateway device.

wherein the terminal gateway device may comprise: an SLIC drive module, a voice Digital Signal Processing (DSP) module, a Real-Time Transmission Protocol (RTP)/RTP Control Protocol (RTCP) module, an SIP module and a voice application module, wherein the SLIC drive module is used for detecting an SPI signal coming from the SLIC, determining whether the currently initiated call is a VOIP call or a CS call, encoding a PCM line signal into a VOIP or CS voice code stream corresponding to the type of the call, sending the encoded voice code stream to the voice DSP module, and decoding a VOIP voice code stream or CS voice code stream from the voice DSP module to a PCM line signal;

the voice DSP module is used for compressing and encapsulating an encoded voice code stream to obtain a voice data packet, sending the voice data packet to the RTP/RTCP module in the case of a VOIP call or to the voice application module in the case of a CS call, and unpacking and decompressing a voice data packet from the RTP/RTCP module or the voice application module to obtain a VOIP voice code stream or CS voice code stream;

the RTP/RTCP module is used for real-time transmission control of a voice data packet over an IP network for a VOIP call and is mainly for sending a voice data packet from the voice DSP module to the wireless broadband module via the voice application module and further to the IP network via the wireless broadband module, and sending a voice data packet received by the voice application module to the voice DSP module;

the SIP module is used for creating, modifying and releasing a VOIP session; and the voice application module is used for identifying a voice code stream coming from the wireless broadband module, determining whether a currently initiated call is a VOIP call or CS call; if the currently initiated call is a VOIP call, establishing a connection between the terminal gateway device and the wireless broadband module through a Point-to-Point Protocol (PPP) and sending a received voice data packet to the RTP/RTCP module; if the currently initiated call is a CS call, sending a received voice code stream to the voice DSP module.

Wherein the terminal gateway device may further comprise a Web subscriber management interface module for registration and authentication configuration of an SIP server and a port thereof.

The present invention further provides a system for supporting VOIP and CS telephone, comprising a terminal gateway device, a wireless broadband module, an SLIC and a SWITCH, wherein the wireless broadband module is used for realizing network registration of VOIP telephone, connection to a WAN and establishment of CS telephone, and completing transmission of a voice code stream between the terminal gateway device and a wireless broadband network; further for establishing a CS connection if a CS voice code stream is transmitted through a PCM line from the SLIC to the wireless broadband module, converting a PCM line signal into a CS voice code stream and sending the converted CS voice code stream to the wireless broadband network, and converting a CS voice code stream from the wireless broadband network into a PCM line signal;

the terminal gateway device is used for determining whether a currently initiated call is a VOIP call or a CS call according to a received signal; if the currently initiated call is a VOIP call, establishing an SIP connection via the wireless broadband module, converting a PCM line signal into a VOIP voice code stream, and sending the converted VOIP voice code stream to the wireless broadband network via the wireless broadband module or converting a VOIP voice code stream from the wireless broadband module into a PCM line signal; if the currently initiated call is a CS call, establishing a CS connection via the wireless broadband module, converting a PCM line signal into a CS voice code stream, and sending the converted CS voice code stream to the wireless broadband network via the wireless broadband module or converting a CS voice code stream from the wireless broadband module into a PCM line signal;

the terminal gateway device is further used for determining whether a PCM line for transmitting a CS voice code stream is from the SLIC to the terminal gateway device or from the SLIC to the wireless broadband module, and controlling the SWITCH to establish a corresponding PCM line for transmitting the CS voice code stream;

the SLIC is used for bidirectional transmission of an SPI signal between a telephone and the terminal gateway device as well as bidirectional transmission of a PCM line signal between a telephone and the SWITCH; and the SWITCH is used for transmission of a VOIP voice code stream between the terminal gateway device and the SLIC, and establishment of a PCM line from the SLIC to the terminal gateway device or to the wireless broadband module for transmitting a CS voice code stream.

Wherein the terminal gateway device may comprise: an SLIC drive module, a voice DSP module, an RTP/RTCP module, an SIP module, a voice application module and a Web subscriber management interface module, wherein the SLIC drive module is used for detecting an SPI signal coming from the SLIC, determining whether a currently initiated call is a VOIP call or a CS call, encoding a PCM line signal to a VOIP or CS voice code stream corresponding to the type of the call, sending the encoded voice code stream to the voice DSP module, and decoding a VOIP or CS voice code stream from the voice DSP module to a PCM line signal;

the voice DSP module is used for compressing and encapsulating an encoded voice code stream to obtain a voice data packet, sending the voice data packet to the RTP/RTCP module in the case of a VOIP call or to the voice application module in the case of a CS call, and unpacking and decompressing a voice data packet from the voice application module or RTP/RTCP module to obtain a VOIP voice code stream or CS voice code stream;

the RTP/RTCP module is used for real-time transmission control of a voice data packet over an IP network for a VOIP call and is mainly for sending a voice data packet from the voice DSP module to the wireless broadband module via the voice application module and further to an IP network via the wireless broadband module, and sending a voice data packet received by the voice application module to the voice DSP module;

the SIP module is used for creating, modifying and releasing a VOIP session;

the voice application module is used for identifying a voice code stream coming from the wireless broadband module, determining whether a currently initiated call is a VOIP call or CS call; if the currently initiated call is a VOIP call, establishing a connection between the terminal gateway device and the wireless broadband module through a Point-to-Point Protocol (PPP), sending a received voice data packet to the RTP/RTCP module; if the currently initiated call is a CS call, sending a received voice code stream to the voice DSP module; and the Web subscriber management interface module is used for controlling, if the SLIC drive module determines the currently initiated call is a CS call, the SWITCH to establish a PCM line from the SLIC to the terminal gateway device or from the SLIC to the wireless broadband module for transmitting a CS voice code stream.

Wherein the Web subscriber management interface module may be further used for registration and authentication configuration of an SIP server and a port thereof.

In the technical solution above, the wireless broadband module may be a mobile communication module under Time Division-Synchronization Code Division Multiple Access (TD-SCDMA), Wideband Code Division Multiple Access (WCDMA) and Code Division Multiple Access (CDMA) 2000 and Long-term Evolution (LTE) of a Beyond 3G (B3G) mobile communication system, Worldwide Interoperability For Microwave Access (WIMAX) and other different protocols; or the wireless broadband module may be compatible with General Packet Radio Service (GPRS) based on packet domain IP, or Enhanced Data Rate for GSM Evolution (EDGE) and various evolved radio access modes.

The present invention further provides a method for supporting VOIP and CS telephone, comprising a calling process and a called process, which are realized as follows:

the calling process comprises:

a user picks up a telephone, an off-hook signal is sent to a terminal gateway device via an SPI, the terminal gateway device plays an off-hook tone and sends the off-hook tone to the telephone via an SLIC, and the off-hook tone is played to the user via the telephone;

the user dials, using the telephone, a VOIP or CS number in different ways, and the terminal gateway device identifies a dialing signaling;

the user establishes a VOIP or CS communication connection with a called party, a PCM line signal of each of the communications is converted into a corresponding voice code stream and then the corresponding voice code stream is transmitted to the called party, and a voice code stream of the called party is converted into a PCM line signal and then the PCM line signal is transmitted to the caller; and the user hangs up, the terminal gateway device detects a hand-up button and releases the communication connection;

and the called process comprises:

the terminal gateway device receives a call request from the caller and determines whether the received call request is a VOIP request or a CS request;

the called party establishes a VOIP or CS session connection with the caller, and the SLIC transmits ring information and a telephone number to the telephone;

the called party picks up a telephone, a VOIP or CS voice code stream is converted into a PCM line signal and then the PCM line signal is transmitted to the SLIC via a PCM line and finally to the user via the telephone, and a PCM line signal of the called party is converted into a VOIP or CS voice code stream and then the VOIP or CS voice code stream is transmitted to the caller; and the called party hangs up, and a wireless broadband module sends a received link removal request to the terminal gateway device, the terminal gateway device releases the session, and the whole call process is ended.

Wherein the process that the user establishes a VOIP or CS communication connection with the called party and voice code streams are transmitted between the user and the called party during the calling process may comprise:

the terminal gateway device sends a dial-up connection request to the called party via the wireless broadband module, a communication is established if the called party accepts the request; if the communication established is a VOIP communication, a PCM line signal is converted into a VOIP voice data packet by the terminal gateway device and then the VOIP voice data packet is transmitted to the called party; and a VOIP voice data packet from the called party is sent to the terminal gateway device via the wireless broadband module and converted into a PCM line signal and then the PCM line signal is transmitted to the caller; and if the communication established is a CS communication, if a CS voice code stream is transmitted through a PCM line from the SLIC to the terminal gateway device, a PCM line signal is converted into a CS voice code stream via the terminal gateway device and the converted CS voice code stream is transmitted to the called party via the wireless broadband module; and a CS voice code stream from the called party is decoded to a PCM line signal by the terminal gateway device and then the PCM line signal is transmitted to the caller; if a CS voice code stream is transmitted through a PCM line from the SLIC to the wireless broadband module, a PCM line signal is converted into a CS voice code stream via the wireless broadband module and the converted CS voice code stream is transmitted to the called party; and a CS voice code stream of the called party is converted into a PCM line signal and then the PCM line signal is transmitted to the caller.

Wherein the process that the called party picks up a telephone and a VOIP and CS voice code stream is transmitted between the called party and the caller during the called process may comprise:

the called party picks up a telephone, if the communication established is a VOIP communication, a VOIP voice data packet is converted into a PCM line signal via the terminal gateway device and then the PCM line signal is transmitted to the SLIC via a PCM line and finally to the called party via the telephone, a PCM line signal of the called party is converted into a VOIP voice data packet via the terminal gateway device and the converted VOIP voice data packet is transmitted to the caller; if the communication established is a CS communication, if a CS voice code stream is transmitted through the PCM line of the wireless broadband module, then the CS voice code stream is transmitted to the terminal gateway device via the wireless broadband module and converted into a PCM line signal and then the PCM line signal is transmitted to the SLIC and finally played to the called party via the telephone, and a PCM line signal of the called party is converted into a CS voice code stream by the terminal gateway device and then the converted CS voice code stream is transmitted to the caller via the wireless broadband module; if the a CS voice code stream is transmitted through a PCM line that the wireless broadband module itself has, then the CS voice code stream is converted into a PCM line signal via the wireless broadband module and finally played to the called party via the telephone, and a PCM line signal of the called party is transmitted to the wireless broadband module and converted into a CS voice code stream and then the converted CS voice code stream is transmitted to the caller.

Thus, the system and method for supporting VOIP and CS telephone provided by the present invention have the following advantages: by taking a single-path SLIC in combination with a switch (SWITCH) as a hardware basis and combining the hardware basis with a corresponding software processing flow, the system and method provided by the present invention enable a user to enjoy different voice services with the same telephone at different prices in different service scenes, and a mobile communication operator can deploy corresponding services as needed, thus the value-adding capability is consequentially enhanced. Besides, compared with a two-path SLIC, the single-path SLIC lowers the whole cost of communication; the use of a SWITCH in combination with a Web subscriber management interface module enables a voice code stream during a CS call to selectively enter a PCM line of a terminal gateway device or directly enter a PCM line of a wireless broadband module, thereby widening the selection range of wireless broadband modules that are applicable to the present invention.

DETAILED DESCRIPTION

The present invention is described below in detail by reference to the accompanying drawings and exemplary embodiments.

Figure 1:
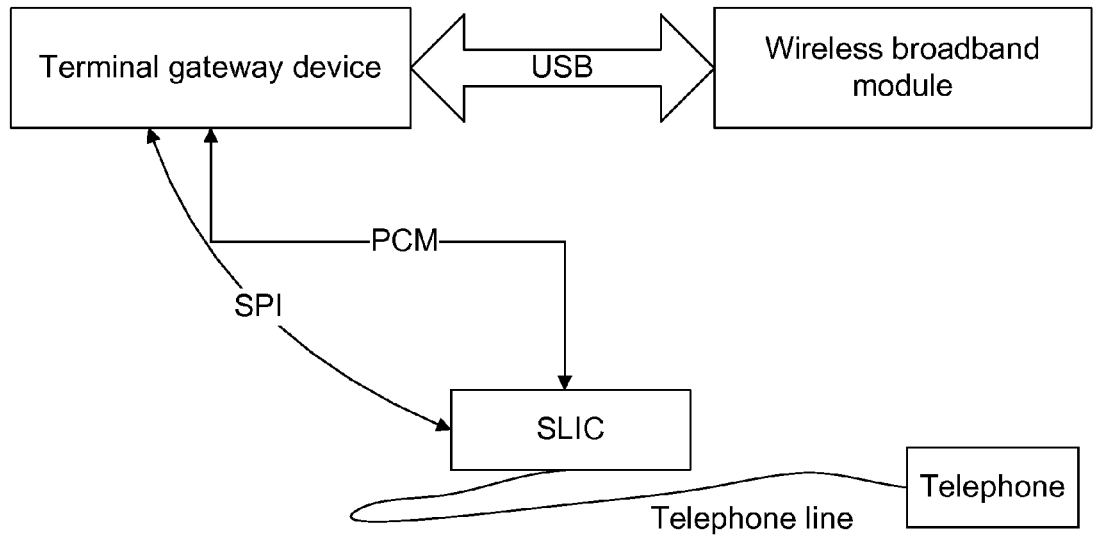
FIG. 1 is a structure block diagram of the present invention when a wireless broadband module has no voice digital signal processing function.

FIG. 1 is a structure block diagram of the present invention when a wireless broadband module has no voice Digital Signal Processing (DSP) function, as shown in FIG. 1, a terminal gateway device, a wireless broadband module, an SLIC, a telephone and etc. are included, wherein the telephone is used for receiving a number dialed by a user, reporting pressed buttons, transmitting a voice signal and displaying a caller ID (Calling Identity Delivery), and so on;

the SLIC is used for bidirectional transmission of a Serial Peripheral Interface (SPI) signal between the telephone and the terminal gateway device, as well as bidirectional transmission of a PCM line signal between the telephone and the terminal gateway device.

the terminal gateway device is used for determining whether a currently initiated call is a VOIP call or a CS call according to a received signal; if the currently initiated call is a VOIP call, establishing a Session Initiation Protocol (SIP) connection via the wireless broadband module, converting a PCM line signal into a VOIP voice code stream, and sending the converted VOIP voice code stream to a wireless broadband network via the wireless broadband module, or converting a VOIP voice code stream from the wireless broadband module into a PCM line signal; if the currently initiated call is a CS call, establishing a CS connection via the wireless broadband module, converting a PCM line signal into a CS voice code stream, and sending the converted CS voice code stream to a wireless broadband network via the wireless broadband module, or converting a CS voice code stream from the wireless broadband module into a PCM line signal;

the signal herein for the terminal gateway device to determine whether a currently initiated call is a VOIP call or a CS call may be a received SPI signal or an AT command or SIP signaling sent from the wireless broadband module;

and the wireless broadband module is used for realizing network registration of VOIP telephone, connection to a WAN and establishment of CS telephone, and completing transmission of a voice code stream between the terminal gateway device and the wireless broadband network.

Figure 2:
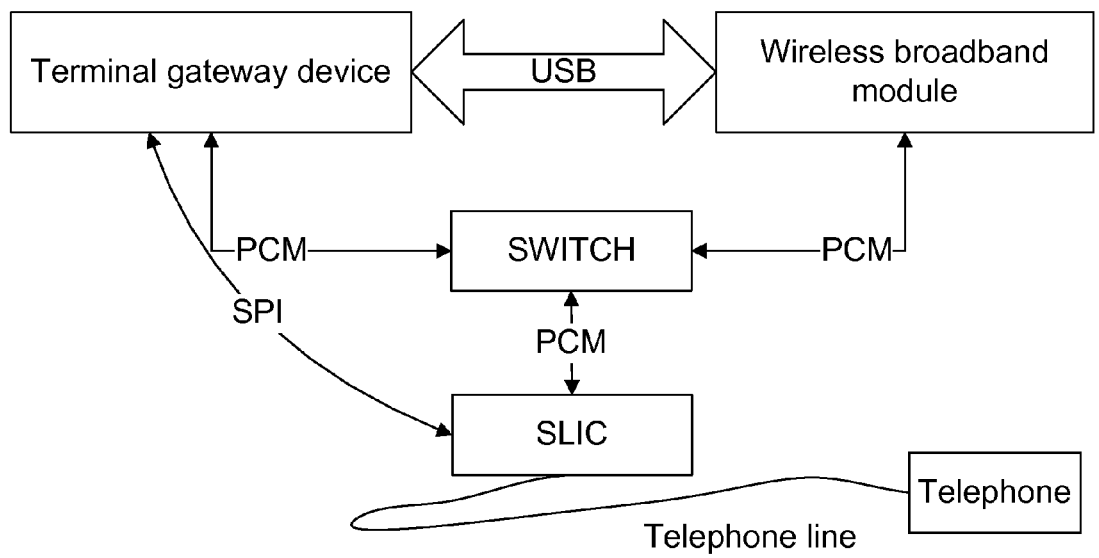
FIG. 2 is a structure block diagram of the present invention when a wireless broadband module has a voice digital signal processing function.

FIG. 2 is a structure block diagram of the present invention when a wireless broadband module has a voice DSP function, as shown in FIG. 2, a terminal gateway device, a wireless broadband module, a SWITCH, an SLIC and a telephone, etc. are included, that is, a SWITCH is added on the basis of the structure shown in FIG. 1, wherein the SWITCH is used for transmitting a VOIP voice code stream between the terminal gateway device and the SLIC, and establishing a PCM line from the SLIC to the terminal gateway device or to the wireless broadband module for transmitting a CS voice code stream;

the terminal gateway device is used for determining whether a currently initiated call is a VOIP call or a CS call according to a received signal; if the currently initiated call is a VOIP call, establishing an SIP connection via the wireless broadband module, converting a PCM line signal into a VOIP voice code stream, and sending the converted VOIP voice code stream to a wireless broadband network via the wireless broadband module, or converting a VOIP voice code stream from the wireless broadband module into a PCM line signal; if the currently initiated call is a CS call, establishing a CS connection via the wireless broadband module, converting a PCM line signal into a CS voice code stream, and sending the converted CS voice code stream to a wireless broadband network via the wireless broadband module, or converting a CS voice code stream from the wireless broadband module into a PCM line signal;

the terminal gateway device is further used for determining whether a PCM line for transmitting a CS voice code stream is from the SLIC to the terminal gateway device or from the SLIC to the wireless broadband module, and controlling the SWITCH to establish a corresponding PCM line for transmitting the CS voice code stream;

the wireless broadband module is used for realizing network registration of VOIP telephone, connection to a WAN and establishment of CS telephone, and completing transmission of a voice code stream between the terminal gateway device and a wireless broadband network; the wireless broadband module is further used for, if a CS voice code stream is transmitted through a PCM line from the SLIC to the wireless broadband module, establishing a CS connection, converting a PCM line signal into a CS voice code stream, sending the converted CS voice code stream to the wireless broadband network, or converting a CS voice code stream from the wireless broadband network into a PCM line signal; and the SLIC is used for bidirectional transmission of an SPI signal between the telephone and the terminal gateway device as well as bidirectional transmission of a PCM line signal between the telephone and the SWITCH.

The wireless broadband modules illustrated in FIG. 1 and FIG. 2 can be communication modules under Time Division-Synchronization Code Division Multiple Access (TD-SCDMA), Wideband Code Division Multiple Access (WCDMA) and Code Division Multiple Access (CDMA) 2000 and Long-term Evolution (LTE) in B3G, or Worldwide Interoperability for Microwave Access (WIMAX) and other different protocols; said wireless broadband modules can also be compatible with General Packet Radio Service (GPRS) based on packet-domain IP, Enhanced Data Rate for GSM Evolution (EDGE) and various evolved radio access modes so as to be more flexible, so that the gateway system of the present invention can be applied in different areas.

Figure 3:
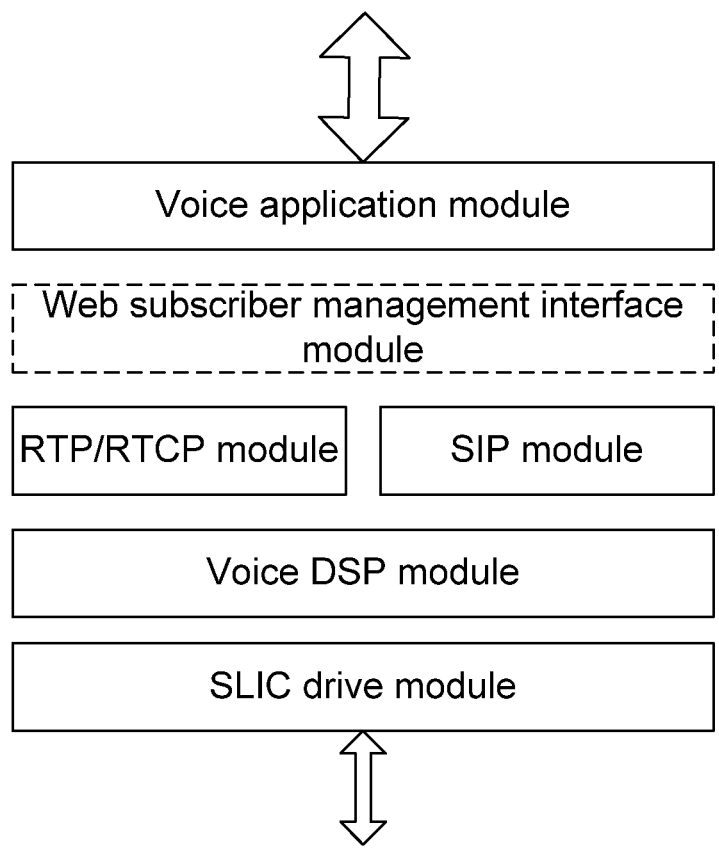
FIG. 3 is a structure block diagram illustrating implement the present invention.

As shown in FIG. 3, the modules running on the terminal gateway device comprise an SLIC drive module, a voice DSP module, a Real-time Transport Protocol (RTP)/RTP control protocol (RTCP) module, an SIP module and a voice application module, wherein the SLIC drive module is used for detecting an SPI signal coming from the SLIC, determining whether the currently initiated call is a VOIP or a CS call, encoding a PCM line signal to a VOIP voice code stream if the currently initiated call is a VOIP call, or encoding a PCM line signal to a CS voice code stream if the currently initiated call is a CS call, then sending the encoded voice code stream to the voice DSP module, and decoding a VOIP voice code stream or a CS voice code stream from the voice DSP module to a PCM line signal;

the voice DSP module is used for compressing and encapsulating an encoded voice code stream to obtain a voice data packet, sending the voice data packet to the RTP/RTCP module in the case of a VOIP call or to the voice application module in the case of a CS call, and unpacking and decompressing a voice data packet from the RTP/RTCP module or the voice application module to obtain a VOIP voice code stream or CS voice code stream;

the RTP/RTCP module is used for real-time transmission control of a voice data packet over an IP network for a VOIP call, and is mainly for sending a voice data packet from the voice DSP module to the wireless broadband module via the voice application module and further to the IP network via the wireless broadband module, and sending a voice data packet received by the voice application module to the voice DSP module;

the SIP module is used for creating, modifying and releasing a VOIP session; and the voice application module is used for identifying a voice code stream from the wireless broadband module, determining whether the currently initiated call is a VOIP call or CS call; if the currently initiated call is a VOIP call, establishing a connection between the terminal gateway device and the wireless broadband module through a Point-to-Point Protocol (PPP) and sending a received voice data packet to the RTP/RTCP module; if the currently initiated call is a CS call, sending a received voice code stream to the voice DSP module.

The terminal gateway device shown in FIG. 2 further comprises a Web subscriber management interface module which is used for controlling, if the SLIC drive module determines the currently initiated call is a CS call, the SWITCH to establish a PCM line from the SLIC to the terminal gateway device or to the wireless broadband module for transmitting a CS voice code stream.

Here, if a PCM line is established by the SWITCH from the SLIC to the wireless broadband module, the functions corresponding to a CS voice code stream will not be realized in the modules above any more.

In order to explain the specific implementation of the system and method for supporting VOIP and CS telephone in a wireless broadband network in detail, a terminal gateway device platform, which is a voice device based on a TD-SCDMA mode, is taken as an example to explain how to use a single-path SLIC to realize the VOIP and CS telephone service functions. In order to realize the present invention, the following modules are introduced which are corresponding to those illustrated above.

On the basis of a device drive, the terminal gateway device is added with an SLIC drive module, wherein the SLIC drive module is, by default in a compile configuration option, compiled in a kernel, in this way, it is loaded to serve as a character device of the operating system of the terminal gateway device once the operating system is started and cannot be uninstalled during the whole running process of the operating system. For a VOIP call and a CS call, the use of the SLIC drive module is activated, deactivated and controlled respectively through the voice DSP module and the voice application module in manner of a character-device.

The wireless broadband module is connected with the terminal gateway device via a Universal Serial Bus (USB) or a Universal Asynchronous Receiver/Transmitter (UART) and the like. When the wireless broadband module is connected with the terminal gateway device via a USB, the USB may be synchronously enumerated into at least four devices, which are respectively used for a modulator/demodulator for a VOIP call, a USB-based voice channel for a CS call, a channel for communication of an AT command between the terminal gateway device and the wireless broadband module and a channel for the debugging of the wireless broadband module. In a single-path SLIC mode, the modulator/demodulator for a VOIP call and the USB-based voice channel for a CS call cannot be synchronously activated.

The voice DSP module is located above an Operating System (OS), a network protocol stack and a Network Address Translator (NAT), the interfaces of the voice DSP module with the three are an OS adaptation layer. The voice DSP module compresses and encapsulates a voice code stream encoded by the SLIC drive module to obtain a voice data packet, and unpacks and decompresses a voice data packet transmitted from a wireless broadband network. The voice DSP module is an independent module, which calls the bottom SLIC drive module to realize a PCM processing on a voice code stream.

The RTP/RTCP module, serving as a media protocol in a file system of the device drive, mainly takes charge of transmission of a standard voice data packet over an IP network, wherein the RTP/RTCP follows an internet standard. The RTP/RTCP module can be started as a process before a VOIP session is established rather than be loaded and executed once the operating system is started, which reduces the consumption of a random access memory and a CPU.

The SIP module, which is a process of the system, mainly realizes establishment, release and control of a VOIP session. A complete SIP system consists of four parts: an SIP user agent, an SIP register server, an SIP proxy server and an SIP redirection server; the part involved in this technical solution is an SIP user agent, and the other three servers of the SIP can use existing service of Internet or be established independently.

In the technical solution of the present invention, as VOIP telephone is based on an SIP which needs to be configured correspondingly, a Web subscriber management interface module may be introduced into the terminal gateway device. The Web subscriber management interface module can adopt architectures including Common Gateway Interface (CGI) or thttpd or Go Ahead, and mainly realizes two functions: registration and authentication configuration of a SIP server and a port thereof. Thus, a user can modify an SIP service setting in the SIP module at any time to select diversified media services provided by different operators.

The voice application module, which is a system application service module on the terminal gateway device, acts differently for a VOIP call and a CS call; wherein for a VOIP call, the voice application module mainly functions to complete establishment, release and maintenance of a PPP network; and for a CS call, the voice application module mainly realizes functions of calling, link removal and maintenance. This process is required to be loaded once the operating system is started and will exist during the whole life cycle of the operating system.

The SWITCH, which is a circuit switch, can be realized through the control over General Purpose Input/Output (GPIO) by the Web subscriber management interface module, and mainly functions to select a PCM line so that a CS voice code stream can choose to enter a PCM line of the terminal gateway device or directly enter a PCM line of the wireless broadband module.

Based on the system above, the application process of the present invention is described below in detail.

A calling process is as follows:

1: a user picks up a telephone, an off-hook signal is sent to the terminal gateway device via the SPI, the SLIC drive module in the terminal gateway device plays an off-hook tone, and the off-hook tone is transmitted to the telephone via an SLIC and played to the user via the telephone;

2: the user dials a VOIP or CS number in different ways, and the terminal gateway device identifies a dialing signaling;

specifically, the user presses telephone buttons to dial a called number, which can be herein a VOIP number or a CS number, wherein such two numbers can be distinguished from each other by an access number; for example, a CS number can be dialed as same as a common call, that is, being dialed directly, while a VOIP number is called by dialing a VOIP number and an access number so as to be distinguished from a CS number, for example, by adding a specific symbol before or after the VOIP number; for example, a CS number is dialed in the same way that a fixed or mobile telephone number is dialed, while a VOIP number is dialed with a symbol such as '*', '#' and the like before a normal number. The two different VOIP and CS dialing signaling is transmitted to the terminal gateway device via the SPI and identified by the SLIC drive module in the terminal gateway device.

3: the user establishes a VOIP or CS communication with a called party, a PCM line signal of each of the communications is converted into a corresponding voice code stream and then the corresponding voice code stream is transmitted to the called party, and a voice code stream of the called party is converted into a PCM line signal and then the converted PCM line signal is transmitted to the caller;

specifically, if a VOIP number is called, the voice application module in the terminal gateway device establishes a PPP link between the terminal gateway device and the wireless broadband module and informs the SIP module to establish an SIP connection, the SIP module initiates an SIP session with the called party and sends a call request to the called party via an IP network, then the session is established if the called party accepts the call request, sequentially, a PCM line signal is transmitted to the terminal gateway device, and the voice DSP module in the terminal gateway device compresses and packs a VOIP voice code stream encoded by the SLIC drive module, transmits a VOIP data message between the called party and itself under the control of the RTP/RTCP module, unpacks and decompresses a voice data packet of the called party from the voice application module or the RTP/RTCP module to obtain a VOIP voice code stream, and then decodes the VOIP voice code stream to a PCM line signal and sends the PCM line signal to the caller via the telephone;

if a CS number is called, the voice application module in the terminal gateway device initiates a dial-up connection request to the wireless broadband module, the dial-up connection request is sent to the called party via the wireless broadband network, then a communication connection is established if the called party accepts the call request; if the wireless broadband module has no voice DSP function, then a PCM line signal is converted into a CS voice code stream via the terminal gateway device, and the converted CS voice code stream is transmitted to the called party via the wireless broadband module, sequentially, a CS voice code stream from the called party is decoded to a PCM line signal via the terminal gateway device and then the PCM line signal is sent to the caller; if the wireless broadband module has a voice DSP function, then the terminal gateway device determines whether a PCM line for transmitting a CS voice code stream is from the SLIC to the terminal gateway device or from the SLIC to the wireless broadband module, and controls the SWITCH to establish a corresponding PCM line for transmitting the CS voice code stream; if the CS voice code stream is transmitted through a PCM line from the SLIC to the terminal gateway device, then the PCM line signal is converted into a CS voice code stream by the terminal gateway device and then the converted CS voice code stream is transmitted to the called party via the wireless broadband module, and a CS voice code stream from the called party is decoded to a PCM line signal via the terminal gateway device and then the PCM line signal is transmitted to the caller, and if the CS voice code stream is transmitted through a PCM line from the SLIC to the wireless broadband module, then the wireless broadband module converts the PCM line signal into a CS voice code stream and transmits the converted CS voice code stream to the called party, and converts a CS voice code stream of the called party to a PCM line signal and transmits the PCM line signal to the caller.

And 4: the user hangs up, and the terminal gateway device detects a hang-up button and releases the communication connection;

specifically, the hang-up button is detected by the SLIC drive module in the terminal gateway device once the caller hangs up, the session of the VOIP telephone is released by the SIP module and the PPP link is removed by the voice application module, and the link for the CS telephone is directly removed by the voice application module.

A called process is as follows:

1: the terminal gateway device receives a call request from the caller and determines whether the received call request is a VOIP request or a CS request;

specifically, the wireless broadband module receives a call request from the caller and sends the received call request to the terminal gateway device via a USB, and the voice application module in the terminal gateway device determines that the call request is a VOIP request if an SIP signaling is received or that the call request is a CS request if an AT command is received;

2: a called party establishes a VOIP or CS session connection with the caller, and the SLIC transmits ring information and a telephone number to a telephone;

specifically, if the called party receives a VOIP telephone request, then the voice application module in the terminal gateway device establishes a PPP link between the terminal gateway device and the wireless broadband module, informs the SIP module to establish an SIP session with the caller, and transmits ring information and a telephone number to the telephone via the SLIC;

if the called party receives a CS telephone request, then the voice application module in the terminal gateway device receives a call request sent from the wireless broadband module, and the SLIC transmits ring information and a telephone number to the telephone.

3: the called party picks up the telephone, a VOIP or CS voice code stream is converted into a PCM line signal and then the PCM line signal is transmitted to the SLIC via a PCM line and finally to the called party via the telephone, and a PCM line signal of the called party is converted into a VOIP or CS voice code stream and then the converted VOIP or CS voice code stream is transmitted to the caller;

specifically, the called party picks up the telephone, if the communication is a VOIP communication, then the RTP/RTCP module in the terminal gateway device controls transmission of a voice data packet, the voice DSP module unpacks and decompresses a voice data packet, transmits the unpacked and decompressed voice data packet to the SLIC via a PCM line and finally to the called party via the telephone; and a PCM line signal of the called party is encoded, and sequentially, the voice DSP module compresses and encapsulates the encoded VOIP voice code stream to a voice data packet and sends the voice data packet to the caller;

if the communication is a CS communication, for a wireless broadband module without voice DSP function, a voice code stream is transmitted to the terminal gateway device via the wireless broadband module and converted into a PCM line signal and then the converted PCM line signal is transmitted to the SLIC and finally played to the called party via the receiver or hand-free loudspeaker of the telephone, and, the terminal gateway device converts a PCM line signal of the called party into a CS voice code stream which will be sent to the caller via the wireless broadband module; for a wireless broadband module with a voice DSP function, the terminal gateway device determines a PCM line for transmitting a CS voice code stream, if the CS voice code stream is transmitted via a PCM line that the wireless broadband module itself has, then the wireless broadband module converts the CS voice code stream into a PCM line signal which will be transmitted to the SLIC via the SWITCH and finally played to the called party via the receiver or hand-free loudspeaker of the telephone, and a PCM line signal of the called party transmitted from the SLIC is transmitted to the wireless broadband module via the SWITCH, and converted into a CS voice code stream via the wireless broadband module and then the converted CS voice code stream is transmitted to the caller.

And 4: the called party hangs up, and the wireless broadband module sends a received link removal request to the terminal gateway device, and the terminal gateway device releases the session, and the whole call process is ended;

specifically, the wireless broadband module sends the link removal request received from the called party to the voice application module in the terminal gateway device once the caller hangs up; for VOIP telephone, the voice application module informs the SIP module to release the session, and for CS telephone, the voice application module removes the circuit, and then the whole call process is ended.

The present invention is also applicable to various wireless networks supporting a packet domain and a circuit domain, wherein the wireless networks may include TD-SCDMA, WCDMA, CDMA2000, WIMAX, LTE, GPRS, EDGE, High Speed Packet access (HSPA) and the like.

The mentioned above is only preferred embodiments of the invention but not limitation to the protection scope of the invention; it should be understood that any modification, equivalent substitute and improvement devised without departing from the spirit and scope of the invention belong to the protection scope of the invention.

The invention claimed is:

1. A system for supporting Voice over Internet Protocol (VOIP) and Circuit Switch (CS) telephone, comprising a terminal gateway device, a wireless broadband module and a Subscriber Line Interface Circuit (SLIC), wherein the wireless broadband module is used for realizing network registration of a VOIP call, connection to a Wide Area Network (WAN) and establishment of a CS call and completing transmission of a voice code stream between the terminal gateway device and a wireless broadband network;

the terminal gateway device is used for determining whether a currently initiated call is a VOIP call or a CS call according to a received signal; if the currently initiated call is a VOIP call, establishing a Session Initiation Protocol (SIP) connection via the wireless broadband module, converting a Pulse Code Modulation (PCM) line signal into a VOIP voice code stream, and sending the converted VOIP voice code stream to the wireless broadband network via the wireless broadband module or converting a VOIP voice code stream from the wireless broadband module into a PCM line signal; if the currently initiated call is a CS call, establishing a CS connection via the wireless broadband module, converting a PCM line signal into a CS voice code stream, and sending the converted CS voice code stream to the wireless broadband network via the wireless broadband module or converting a CS voice code stream from the wireless broadband module into a PCM line signal; and the SLIC is used for bidirectional transmission of a Serial Peripheral Interface (SPI) signal between a telephone and the terminal gateway device as well as bidirectional transmission of a PCM line signal between a telephone and the terminal gateway device;

wherein the terminal gateway device comprises an SLIC drive module, a voice Digital Signal Processing (DSP) module, a Real-Time Transmission Protocol (RTP)/RTP Control Protocol (RTCP) module, an SIP module and a voice application module, wherein the SLIC drive module is used for detecting an SPI signal coming from the SLIC, determining whether the currently initiated call is a VOIP call or a CS call, encoding a PCM line signal into a VOIP or CS voice code stream corresponding to the type of the call, sending the encoded voice code stream to the voice DSP module, and decoding a VOIP voice code stream or CS voice code stream from the voice DSP module to a PCM line signal;

the voice DSP module is used for compressing and encapsulating an encoded voice stream to obtain a voice data packet, sending the voice data packet to the RTP/RTCP module in the case of a VOIP call or to the voice application module in the case of a CS call, and unpacking and decompressing a voice data packet from the RTP/RTCP module or the voice application module to obtain a VOIP voice code stream or CS voice code stream;

the RTP/RTCP module is used for real-time transmission control of a voice data packet over an IP network for a VOIP call and is mainly used for sending a voice data packet from the voice DSP module to the wireless broadband module via the voice application module and further to the IP network via the wireless broadband module, and sending a voice data packet received by the voice application module to the voice DSP module;

the SIP module is used for creating, modifying and releasing a VOIP session; and the voice application module is used for identifying a voice code stream coming from the wireless broadband module, determining whether a currently initiated call is a VOIP call or CS call; if the currently initiated call is a VOIP call, establishing a connection between the terminal gateway device and the wireless broadband module through a Point-to-Point Protocol (PPP) and sending a received voice data packet to the RTP/RTCP module; if the currently initiated call is a CS call, sending a received voice code stream to the voice DSP module.

2. The system for supporting VOIP and CS telephone according to claim 1, wherein the terminal gateway device further comprises a Web subscriber management interface module for registration and authentication configuration of an SIP server and a port thereof.

3. A system for supporting Voice over Internet Protocol (VOIP) and Circuit Switch (CS) telephone, comprising a terminal gateway device, a wireless broadband module, a Subscriber Line Interface Circuit (SLIC) and a SWITCH, wherein the wireless broadband module is used for realizing network registration of a VOIP call, connection to a WAN and establishment of a CS call, and completing transmission of a voice code stream between the terminal gateway device and a wireless broadband network; further for establishing a CS connection if a CS voice code stream is transmitted through a Pulse Code Modulation (PCM) line from the SLIC to the wireless broadband module, converting a PCM line signal into a CS voice code stream and sending the converted CS voice code stream to the wireless broadband network, and converting a CS voice code stream from the wireless broadband network into a PCM line signal;

the terminal gateway device is used for determining whether a currently initiated call is a VOIP call or a CS call according to a received signal; if the currently initiated call is a VOIP call, establishing a Session Initiation Protocol (SIP) connection via the wireless broadband module, converting a PCM line signal into a VOIP voice code stream, and sending the converted VOIP voice code stream to the wireless broadband network via the wireless broadband module or converting a VOIP voice code stream from the wireless broadband module into a PCM line signal; if the currently initiated call is a CS call, establishing a CS connection via the wireless broadband module, converting a PCM line signal into a CS voice code stream, and sending the converted CS voice code stream to the wireless broadband network via the wireless broadband module or converting a CS voice code stream from the wireless broadband module into a PCM line signal;

the terminal gateway device is further used for determining whether a PCM line for transmitting a CS voice code stream is from the SLIC to the terminal gateway device or from the SLIC to the wireless broadband module, and controlling the SWITCH to establish a corresponding PCM line for transmitting the CS voice code stream;

the SLIC is used for bidirectional transmission of a Serial Peripheral Interface (SPI) signal between a telephone and the terminal gateway device as well as bidirectional transmission of a PCM line signal between a telephone and the SWITCH; and the SWITCH is used for transmission of a VOIP voice code stream between the terminal gateway device and the SLIC, and establishment of a PCM line from the SLIC to the terminal gateway device or to the wireless broadband module for transmitting a CS voice code stream;

wherein the terminal gateway device comprises an SLIC drive module, a voice Digital Signal Processing (DSP) module, a Real-Time Transmission Protocol (RTP)/RTP Control Protocol (RTCP) module, an SIP module, a voice application module and a Web subscriber management interface module, wherein the SLIC drive module is used for detecting an SPI signal coming from the SLIC, determining whether a currently initiated call is a VOIP call or a CS call, encoding a PCM line signal to a VOIP or CS voice code stream corresponding to the type of the call, sending the encoded voice code stream to the voice DSP module, and decoding a VOIP or CS voice code stream from the voice DSP module to a PCM line signal;

the voice DSP module is used for compressing and encapsulating an encoded voice code stream to obtain a voice data packet, sending the voice data packet to the RTP/RTCP module in the case of a VOIP call or to the voice application module in the case of a CS call, and unpacking and decompressing a voice data packet from the RTP/RTCP module or the voice application module to obtain a VOIP voice code stream or CS voice code stream;

the RTP/RTCP module is used for real-time transmission control of a voice data packet over an IP network for a VOIP call and is mainly for sending a voice data packet from the voice DSP module to the wireless broadband module via the voice application module and further to the IP network via the wireless broadband module, and sending a voice data packet received by the voice application module to the voice DSP module;

the SIP module is used for creating, modifying and releasing a VOIP session;

the voice application module is used for identifying a voice code stream coming from the wireless broadband module, determining whether a currently initiated call is a VOIP call or CS call; if the currently initiated call is a VOIP call, establishing a connection between the terminal gateway device and the wireless broadband module through a PPP, and sending a received voice data packet to the RTP/RTCP module; if the currently initiated call is a CS call, sending a received voice code stream to the voice DSP module; and the Web subscriber management interface module is used for controlling, if the SLIC drive module determines the currently initiated call is a CS call, the SWITCH to establish a PCM line from the SLIC to the terminal gateway device or from the SLIC to the wireless broadband module for transmitting a CS voice code stream.

4. The system for supporting VOIP and CS telephone according to claim 3, wherein the Web subscriber management interface module is further used for registration and authentication configuration of an SIP server and a port thereof.

5. The system for supporting VOIP and CS telephone according to claim 4, wherein the wireless broadband module is a mobile communication module under Time Division-Synchronization Code Division Multiple Access (TD-SCDMA), Wideband Code Division Multiple Access (WCDMA) and Code Division Multiple Access (CDMA) 2000 and Long-term Evolution (LTE) of a Beyond 3G (B3G) mobile communication system, Worldwide Interoperability for Microwave Access (WIMAX) and other different protocols; or the wireless broadband module is compatible with General Packet Radio Service (GPRS) based on packet domain IP, or Enhanced Data Rate for GSM Evolution (EDGE) and various evolved radio access modes.

6. The system for supporting VOIP and CS telephone according to claim 3, wherein the wireless broadband module is a mobile communication module under Time Division-Synchronization Code Division Multiple Access (TD-SCDMA), Wideband Code Division Multiple Access (WCDMA) and Code Division Multiple Access (CDMA) 2000 and Long-term Evolution (LTE) of a Beyond 3G (B3G) mobile communication system, Worldwide Interoperability for Microwave Access (WIMAX) and other different protocols; or the wireless broadband module is compatible with General Packet Radio Service (GPRS) based on packet domain IP, or Enhanced Data Rate for GSM Evolution (EDGE) and various evolved radio access modes.

7. A method for supporting Voice over Internet Protocol (VOIP) and Circuit Switch (CS) telephone, comprising a calling process and a called process, wherein the calling process mainly comprises:

a user picks up a telephone, an off-hook signal is sent to a terminal gateway device via a Serial Peripheral Interface (SPI), the terminal gateway device plays an off-hook tone and sends the off-hook tone to the telephone via a Subscriber Line Interface Circuit (SLIC), and the off-hook tone is played to the user via the telephone;

the user dials a VOIP or CS number in different ways, and the terminal gateway device identifies a dialing signaling;

the user establishes a VOIP or CS communication connection with a called party, a Pulse Code Modulation (PCM) line signal of each of the communications is converted into a corresponding voice code stream and then the corresponding voice code stream is transmitted to the called party, and a voice code stream of the called party is converted into a PCM line signal and then the PCM line signal is transmitted to the caller; and the user hangs up, the terminal gateway device detects a hand-up button and releases the communication connection;

and the called process comprises:

the terminal gateway device receives a call request from the caller and determines whether the received call request is a VOIP request or a CS request;

the called party establishes a VOIP or CS session connection with the caller, and the SLIC transmits ring information and a telephone number to the telephone;

the called party picks up a telephone, a VOIP or CS voice code stream is converted into a PCM line signal and then the PCM line signal is transmitted to the SLIC via a PCM line and finally to the user via the telephone, and a PCM line signal of the called party is converted into a VOIP or CS voice code stream and then the VOIP or CS voice code stream is transmitted to the caller; and the called party hangs up, and a wireless broadband module sends a received link removal request to the terminal gateway device, the terminal gateway device releases the session, and the whole call process is ended;

wherein the process that the user establishes a VOIP or CS communication connection with a called party and voice code streams are transmitted between the user and the called party during the calling process comprises:

the terminal gateway device sends a dial-up connection request to the called party via the wireless broadband module, a communication is established if the called party accepts the request; if the communication established is a VOIP communication, a PCM line signal is converted into a VOIP voice data packet by the terminal gateway device and then the VOIP voice data packet is transmitted to the called party; and a VOIP voice data packet from the called party is sent to the terminal gateway device via the wireless broadband module and converted into a PCM line signal and then the PCM line signal is transmitted to the caller; and if the communication established is a CS communication, if a CS voice code stream is transmitted through a PCM line from the SLIC to the terminal gateway device, a PCM line signal is converted into a CS voice code stream via the terminal gateway device and the converted CS voice code stream is transmitted to the called party via the wireless broadband module; and a CS voice code stream from the called party is decoded to a PCM line signal by the terminal gateway device and then the PCM line signal is transmitted to the caller; if a CS voice code stream is transmitted through a PCM line from the SLIC to the wireless broadband module, a PCM line signal is converted into a CS voice code stream via the wireless broadband module and the converted CS voice code stream is transmitted to the called party; and a CS voice code stream of the called party is converted into a PCM line signal and then the PCM line signal is transmitted to the caller.

8. The method for supporting VOIP and CS telephone according to claim 7, wherein the process that the called party picks up a telephone and a VOIP or CS voice code stream is transmitted between the called party and the caller during the called process comprises:

the called party picks up a telephone, if the communication established is a VOIP communication, a VOIP voice data packet is converted into a PCM line signal via the terminal gateway device and then the PCM line signal is transmitted to the SLIC via a PCM line and finally to the called party via the telephone, a PCM line signal of the called party is converted into a VOIP voice data packet via the terminal gateway device and the converted VOIP voice data packet is transmitted to the caller; and if the communication established is a CS communication, if a CS voice code stream is transmitted through a PCM line of the wireless broadband module, then the CS voice code stream is transmitted to the terminal gateway device via the wireless broadband module and converted into a PCM line signal and then the PCM line signal is transmitted to the SLIC and finally played to the called party via the telephone, and a PCM line signal of the called party is converted into a CS voice code stream by the terminal gateway device and then the converted CS voice code stream is transmitted to the caller via the wireless broadband module; if a CS voice code stream is transmitted through a PCM line that the wireless broadband module itself has, then the CS voice code stream is converted into a PCM line signal by the wireless broadband module and finally played to the called party via the telephone, and a PCM line signal of the called party is transmitted to the wireless broadband module and converted into a CS voice code stream and then the converted CS voice code stream is transmitted to the caller.

* * * * *